United States Patent [19]

Martel

[11] 4,240,216
[45] Dec. 23, 1980

[54] LAND FORMING AND/OR FARMING APPARATUS

[75] Inventor: Virgil L. Martel, Nome, Tex.

[73] Assignee: Lehman-H Feeder & Plow, Inc., Corpus Christi, Tex.

[21] Appl. No.: 24,002

[22] Filed: Mar. 26, 1979

[51] Int. Cl.³ ............................................... E02F 5/02
[52] U.S. Cl. ........................................ 37/98; 172/398
[58] Field of Search ............... 172/398, 397, 439, 451, 172/484, 321, 322; 37/98

[56] References Cited

U.S. PATENT DOCUMENTS

| | | | |
|---|---|---|---|
| 3,035,360 | 5/1962 | Johnson | 172/398 X |
| 3,545,033 | 12/1970 | Couser | 172/484 X |
| 4,002,208 | 1/1977 | Rougeau | 172/398 |

Primary Examiner—Clifford D. Crowder
Attorney, Agent, or Firm—Marvin B. Eickenroht; Jennings B. Thompson

[57] ABSTRACT

Apparatus is disclosed wherein a plow is mounted on a frame so as to form a ditch in the ground as the frame is towed behind a tractor. The frame is of such construction and so attached to a three point hitch that its rear end cannot be lifted without first fixing the angular relation of its pivotally connected parts. A means is provided for fixing this relation independently of manipulation of the three point hitch.

6 Claims, 5 Drawing Figures

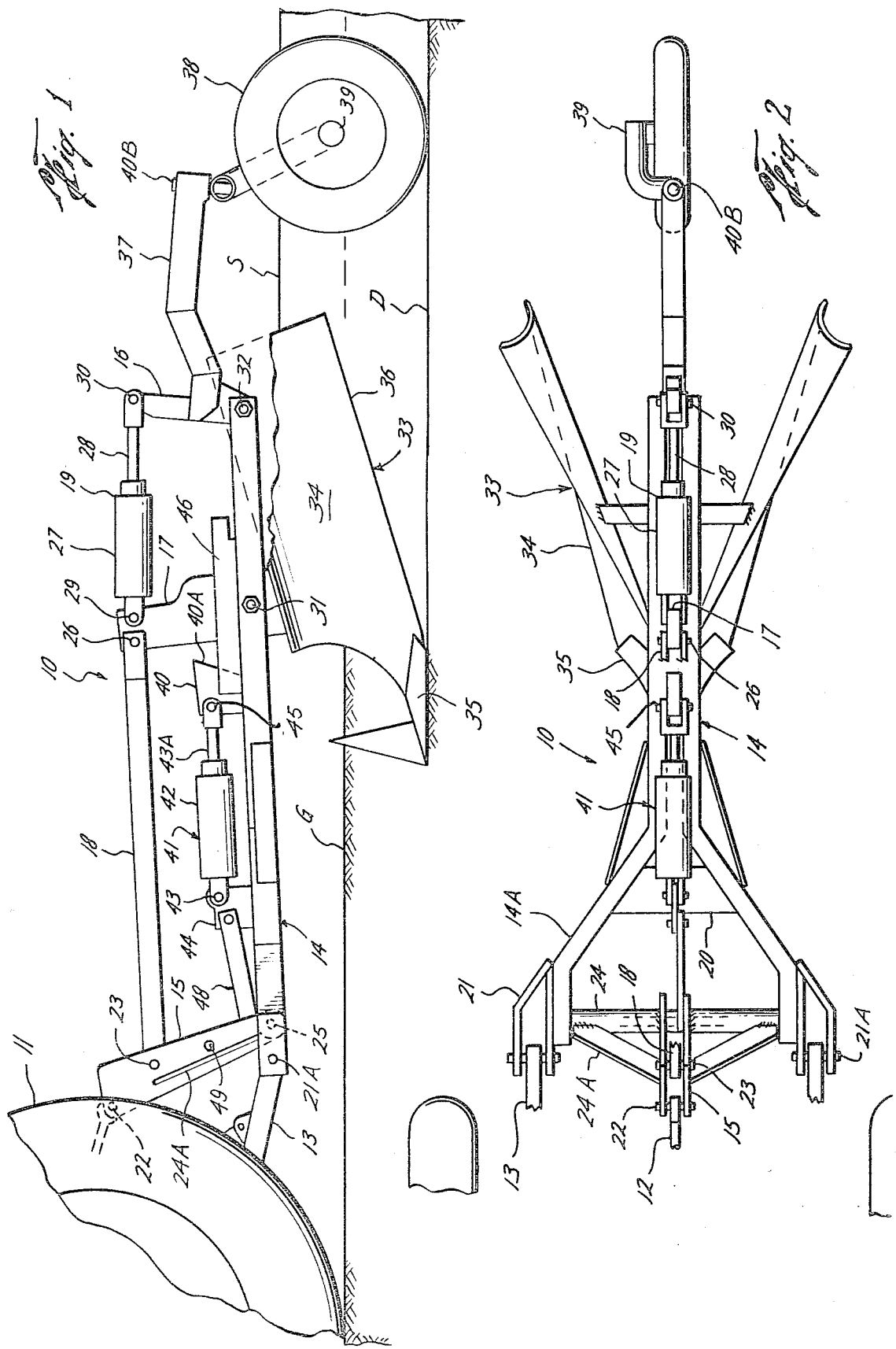

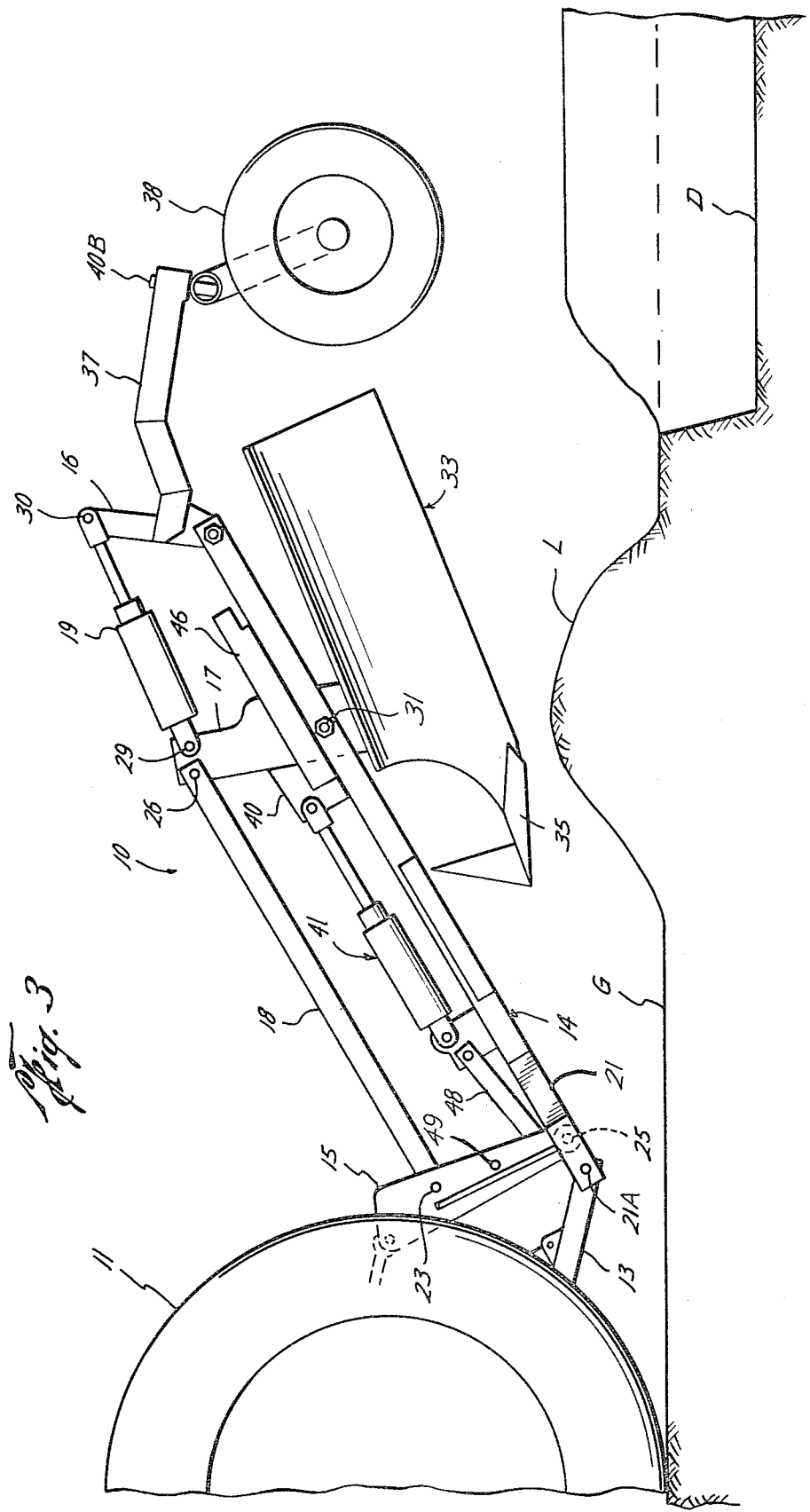

LAND FORMING AND/OR FARMING APPARATUS

This invention relates in general to land forming and/or farming apparatus; and, more particularly, to improvements in apparatus of the type shown in U.S. Pat. No. 4,002,208.

In the embodiment of such apparatus illustrated in the above-mentioned patent, a plow is mounted on a frame so as to form a ditch in the ground as the frame is towed behind a tractor. The frame, which is attachable to a three point hitch of the tractor, includes a longitudinally extending beam and a shank for the plow which comprises a post pivotally connected to the beam intermediate the front and rear ends of the beam. Front and rear posts are pivotally connected to the beam forwardly and rearwardly of the shank, and front and rear links are pivotally connected to the beam forwardly and rearwardly of the shank, and front and rear links are pivotally connected to and extend between the shank and the front and rear posts, respectively. A wheel is mounted on the rear post for rolling engagement with the ground behind the plow, and the rear link includes a fluid-operated, reciprocable actuator which enables it to be extended and retracted in order to raise and lower the wheel and thereby adjust the elevation of the cutting edges of the plow blades so as to form a ditch of desired depth.

Although the apparatus will traverse flat ground when used in the described manner—i.e., to form irrigation ditches in rice fields—it nevertheless may also be used to form a cut through a levee in the field. In accordance with one important feature of the apparatus, the construction and arrangement of the various pivotally connected parts of the frame, and the attachment of the frame to the tractor, is such that the elevation of cutting edges of the blades of the plow, as well as the vertical disposition of the faces of the blades, will remain fixed even as the tractor moves up and over the levee. Consequently, it is possible to form the cut to the same depth as the ditch, and also to maintain uniformity in moving the soil to one side or the other of the cut path.

There are, of course, other land forming operations, such as the formation of drainage ditches, or land planing, in which it would be useful to fix the elevation as well as the vertical disposition of the cutting or smoothing blades despite irregularities in the surface of the ground traversed by the apparatus. For similar reasons, a frame having these characteristics would be useful in mounting tool bars for planters, or other ground engaging elements, and it will be apparent to one skilled in the art that these and other alternatives are contemplated as being within the scope of "land forming and/or farming apparatus" as used in this application.

It is, of course, customary to raise the frame of tractor towed apparatus to a transport position by means of the three point hitch. The framemay also be raised to this position when parked in an inactive position to enable removal of the tractor therefrom, or even the hydraulically operated components, for use at another location. However, due to the attachment of the frame of the above-described apparatus to the upper and lower arms of the hitch, only the front end can be lifted unless the angular relation of its parts to one another is first fixed. Thus, as shown and described in the aforementioned patent, in order to prepare the apparatus for transporting, as from one field to another, a link must first be connected to the front post and beam.

There are other instances in which the operator of such apparatus, while not wishing to transport it, may nevertheless wish to lift the frame, or at least the cutting blades, for a relatively short length of time, and then return it to its former position. For example, in the operations described in the aforementioned patent, the operator may wish to lift the plow over a levee in order to permit the tractor to be moved over the levee without forming a cut through it.

Although the apparatus may be raised to transport position to permit the plow to be moved over the levee, and then lowered to its original position after movement over the levee, this requires that the operator get down from and then back on the tractor, or that additional personnel be present for connecting and disconnecting the link. In either event, it also requires that the operator change the setting of the three point hitch from and back to its original position. The operator might also find it possible to extend the rear link of the frame in order to lower the trailing wheel and thus raise the plow the required amount. However, when the levee has been passed, the operator must retract the rear link to return the plow to its original position, which in turn requires accurate control over the hydraulic system for actuating the link. Neither of these procedures are attractive ones, particularly when the apparatus is being operated in such a manner that the need for raising and lowering the plow may be repetitive.

An object of this invention is to provide apparatus of this type in which the frame may be raised from and lowered to its original position without changing the setting of the three point hitch or the length of the rear link, and further without having to assemble and disassemble a link or other auxiliary parts of the apparatus.

Another object is to provide such apparatus in which the frame may be so raised and lowered by a simple and inexpensive mechanism which is easily and quickly controlled by the operator of the apparatus, as through the hydraulic system of the tractor.

These and other objects are accomplished, in accordance with the illustrated embodiment of the invention, by apparatus of the type described which includes a part mounted on the frame for guided movement longitudinally of the beam, and a fluid-operated, extendible and retractable actuator having one end pivotally connected to the beam and its other end pivotally connected to the guidably movable part. Upon extension and retraction of the actuator, the part is moved between a first position in which a bearing surface thereon is spaced from an oppositely facing bearing surface on one of the posts, a second position in which it is forced against the bearing surface on the post so as to cause the end of the post to swing rearwardly about its pivotal connection of the beam. Due to the pivotal connection of the beam, posts (including the shank) and links of the frame, they react to this swinging of one of the posts of lift the rear end of the frame about its attachment to the three point hitch, and thus raise the cutting edge of the blade, or other ground engaging element, to permit it to pass over the obstruction.

During normal operation of the apparatus, the part is moved to its first position so that it has no influence on the position of the blade. However, when it is desired to pass over a levee or other obstruction, the part is moved to its second position to lift the cutting edge of the blade. Then, when the obstruction is passed, the part may be returned to its first position in order to permit the rear end of the frame and thus the cutting edge of the blade to swing down to its original position. The actuator for so moving the part may be operated by control of the existing hydraulic system on the tractor. In any event, it does not require changing of the setting of either the hitch or the actuator for extending and retracting the rear link. Furthermore, it does not require that the tractor operator, or anyone else, connect and disconnect an auxiliary link, as is the practice in preparing the apparatus for transport.

As previously mentioned, the above-described part may be actuated to lift the rear end of the frame and to hold it in lifted position for parking purposes, whereby the tractor may be removed from the apparatus for use at another location. Then, when the operator again finds use for the apparatus, the frame is in position to be attached to the tractor. Also, if desired, the actuator for extending and retracting the rear link of the apparatus may be removed for use at another location while the apparatus is parked. Still further, the operator of the apparatus may wish to use the above-described part in lifting the rear end of the frame for transport purposes.

In the preferred embodiment of the invention, the bearing surface of the part faces rearwardly and is pushed against a forwardly facing bearing surface on the post, which, as illustrated, is the intermediate post or shank which supports the cutting blade. The beam has a longitudinal guideway in which the part is guidably slidable as it moves between its first and second positions. Preferably, the guideway is a slot through which the shank extends, and arms are mounted on the part for extension longitudinally of the beam to closely receive the shank, the arms sliding over the top side of the beam as they reciprocate with the part.

The bearing surfaces on the part and shank are downwardly divergent so as to extend at an angle to one another, when the part is in its first position, and are essentially parallel to one another when the part is in its second position. Thus, as the part is moved from its first to its second position, the upper edge of its bearing surface first engages the bearing surface on the post to provide maximum mechanical advantage in forcing the upper end of the shank to swing about its pivotal connection to the beam. Then, as the part is moved into its second position, its bearing surface engages that of the shank over a large area to hold the rear end of the frame in its elevated position.

In the drawings, wherein like reference characters are used throughout to designate like parts:

FIG. 1 is a side elevational view of the apparatus as it is being towed behind a tractor to form a ditch in the ground;

FIG. 2 is a top plan view of the apparatus of FIG. 1, with certain of its parts broken away for clarity;

FIG. 3 is another side view of the apparatus, similar to FIG. 1, but upon movement of the bearing part to its second position to lift the rear end of the frame about its attachment to the three point hitch of the tractor, and thereby lift the cutting edge of the blade to a position for moving over a levee;

Figure 4:
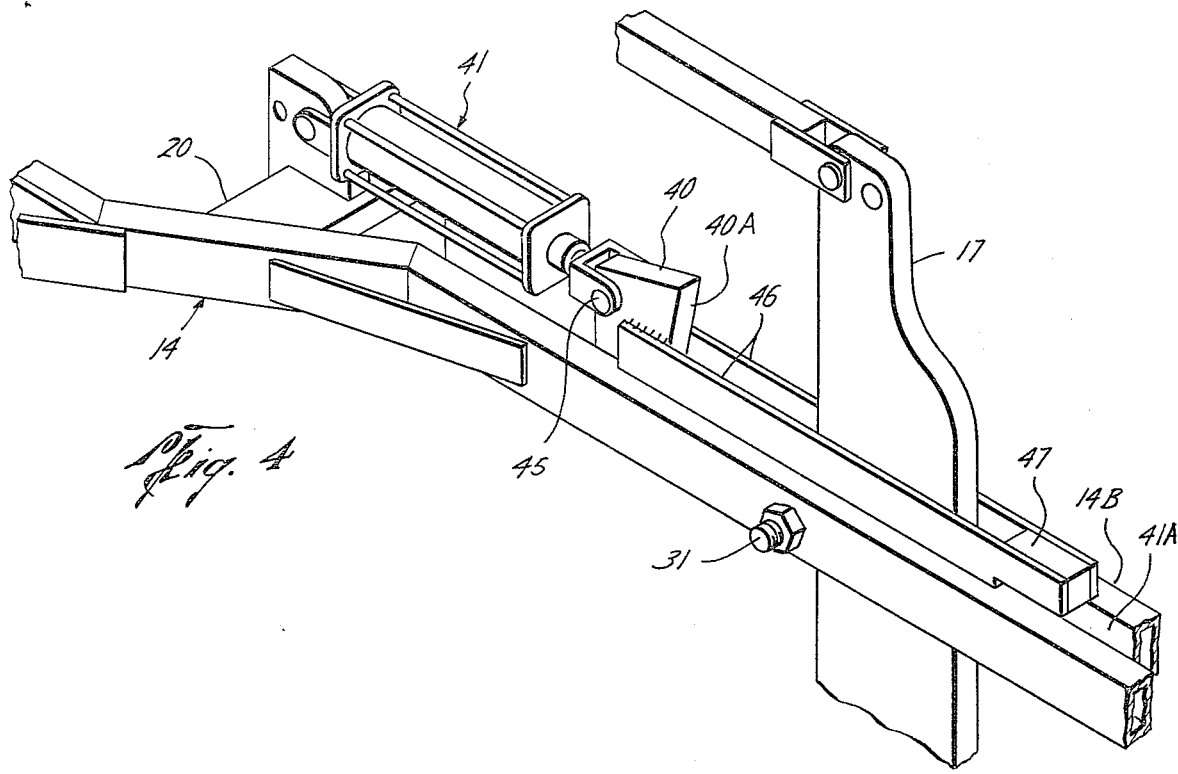
FIG. 4 is an enlarged perspective view of portions of the apparatus including the bearing part and its actuator, with the actuator retracted to move the bearing part to its first position.

With reference now to the details of the above-described apparatus, the frame thereof, which is indicated in its entirety in FIGS. 1 and 2 by reference character 10, is attached to the rear end of a tractor by means of a standard three point hitch on the tractor. As well known in the art, a hitch of this type comprises a centrally located upper arm 12 and lower arms 13 on opposite sides of the upper arm. The lower arms, which act as draw bars for towing the attached apparatus, have their forward ends fixed with respect to the tractor so that they swing in predetermined paths as the hitch is raised and lowered. The upper arm 12, which serves to lift the apparatus being towed, has its forward end pivotally connected to the tractor so that it has some freedom of angular movement with respect thereto as the hitch is raised and lowered.

As will be apparent from FIGS. 1 and 2, the frame 10 of the apparatus is quite similar to that of the apparatus shown in the aforementioned patent. Thus, it includes a longitudinally extending beam 14 whose front end is pivotally attached to the lower arms 13 of the three point hitch, and front, rear and intermediate posts 15, 16 and 17 each pivotally connected to the beam toward its front and rear ends, and intermediate its front and rear ends, respectively. The upper end of front post 15 is pivotally attached to the upper arm 12 of the three point hitch, and front and rear links 18 and 19, respectively, extend between and are pivotally connectible to the upper ends of the front post and intermediate post and the intermediate post and rear post, respectively.

As shown in FIG. 2, the frame is essentially Y-shaped in plan, with beam 14 having longitudinally extending beam members 14A and 14B which are laterally spaced apart at their forward ends and which converge toward one another to extend rearwardly in closely spaced-apart parallel relation. The beam members are connected to one another by suitable means, which includes a plate 20 extending laterally between them near their merger.

Brackets 21 are connected to the outer sides of the forward ends of the beam members and receive pins 21A for pivotally connecting the front end of beam 14 to the rear ends to the lower arms 13 of the three point hitch. Front post 15 comprises spaced-apart plates, the upper ends of which receive a pin 22 for pivotal connection to an eye on the rear end of the upper arm 12 of the three point hitch. The front post plates also receive a pin 23 near its upper end, but below the pin 22, for pivotally connecting the post to front end of link 18 of the frame.

A tube 24 extends through the plates of post 15 and is secured thereto by welding. The portions of the tube which extend from opposite sides of the front post have outer ends which fit closely within the inner sides of the front ends of the beam members 14A and 14B. More particularly, the tube receives a pin 25 whose outer ends are carried by the laterally spaced-apart forward ends of beam members 14A and 14B so as to pivotally connect the lower end of post 15 to the front end of the beam. The tube is supported on each side of post 15 by means of diagonal braces 24A connecting between the outer sides of the plates and the top side of the tube near its ends.

Front link 18 has a clevis on its rear end to receive a pin 26 for pivotal connection to the upper end of shank 17. Rear link 19, on the other hand, includes a fluid-operated, reciprocal actuator having a cylinder 27 and a rod 28 connected to a piston on the cylinder and extending from the cylinder. The piston and thus the rod are reciprocated in the usual manner as operating fluid (from a hydraulic system on the tractor) is introduced to and exhausted from opposite sides of the piston. One end of cylinder 27 is pivotally connected to the upper end of shank 17 by means of a pin 29, and the outer end of rod 28 has a clevis thereon to receive a pin 30 for pivotal connection to the upper end of rear post 16.

Post 17 comprises a relatively thick, heavy plate which fits between the closely spaced-apart rearward portions of beam members 14A and 14B. A pin 31 carried by the frame members extend through a hole in the post so as to pivotally connect the post to the beam intermediate upper and lower ends. Similarly, a pin 32 carried by the rear end of the beam extends through a hole in the lower end of rear post 16 to pivotally connect the rear post to the beam.

The lower end of post 17 serves as a shank to carry a plow 33 adapted to form a ditch D beneath the level of ground G as the apparatus is towed behind the tractor. As shown, the plow comprises a pair of rearwardly divergent blades 34 and a point 35 mounted on the front ends of the blades. Lower cutting edges 36 of the blades extend upwardly in a rearward direction so as to form a substantially V-shaped ditch. As the ditch is formed, rearward extensions of the blades move soil S from the ditch onto the opposite sides thereof.

As previously described, although this invention is particularly well suited for use with apparatus having blades in the form of a plow, it is also applicable to apparatus wherein other types of blades are mounted on the frame for performing other land forming operations, or, for that matter, wherein other ground engaging elements are mounted therefrom, and plow 33 is merely shown for illustrative purposes.

An arm 37 is connected to and extends rearwardly from rear post 16 intermediate its upper and lower ends, and a wheel 38 having a tire about its outer periphery is mounted on the rear end of arm 37 for rolling engagement with the ground behind plow 33. More particularly, and as shown in FIG. 2, the wheel is generally aligned with the frame so as to move in the bottom of the ditch behind the plow.

As will be understood from the drawings, as well as the above-mentioned patent, the elevation of the wheel determines the elevation of the plow and thus the depth to which ditch D is formed. Thus, link 19 may be extended from the position shown in FIG. 1 so as to push the wheel 38 downwardly and thereby raise the level of plow 33 with respect to the ground level. Alternatively, the rear link 19 may be retracted so as to raise the trailing wheel 38 and thus lower the elevation of plow 33.

Preferably, wheel 38 is mounted on an axle 39 suspended from a bent arm 39 whose upper end is in turn pivotally mounted for free rotation about a substantially vertical pin 40B on the rear end of arm 37, whose axis is aligned with the frame. Thus, as described in the previously mentioned patent, wheel 38 acts essentially as a "crazy wheel" in that it is free to turn to some extent about a vertical axis as it rolls along the bottom of the ditch D behind the plow 33.

In accordance with the novel aspects of the present invention, a part 40 in the form of a plate of substantially the same thickness as blade shank 17 is closely received within a slot 41A formed between the spaced-apart inner sides of beam members 14A and 14B. More particularly, plate 40 is so received on the front side of shank 17 for guided longitudinal movement toward and away from the front edge of the shank, which is received between the beam members at the rear end of the slot.

The plate 40 is pivotally connected to the rear end of a fluid-operated, reciprocal actuator 41 similar to the actuator for extending and retracting rear link 19. The front end of actuator 41 is pivotally connected to the beam so that extension and retraction of the actuator moves plate 40 toward and away from the shank. As shown, the actuator includes a cylinder 42 having its front end pivotally connected by a pin 43 to an upright plate 44 mounted on horizontal plate 20 of the beam. A rod 43A connected to a piston reciprocable within cylinder 42 has a clevis 44A on its rear end which is pivotally connected by a pin 45 to the plate 40 above the upper side of beam 14.

More particularly, the plate 40 is supported for guided longitudinal movement on the beam by means of a pair of arms 46 extending rearwardly from opposite sides of the plate 40, with the lower edges of the arms being slidable over the upper edge of beam members 14A and 14B. Preferably, the arms 46 are spaced apart a distance substantially equal to the width of the slot 41A so as to closely receive shank 17, and the rear ends of the arms 46 are connected together by means of a block 47.

Figure 5:
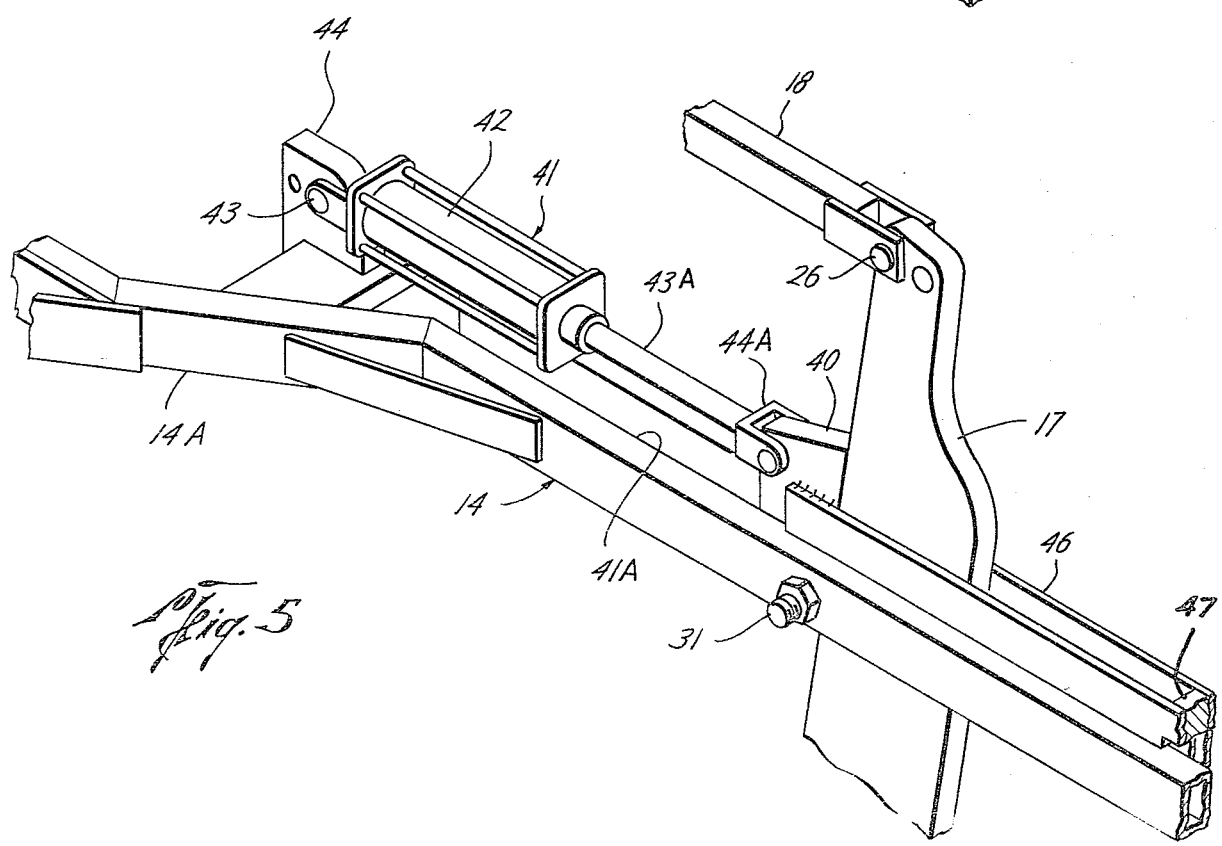
FIG. 5 is a perspective view similar to FIG. 4, but with the actuator extended to move the bearing part to its second position.

As best shown in FIGS. 4 and 5, when the actuator 41 is retracted, plate 40 is pulled forwardly to withdraw a bearing surface 40A on its rear edge a substantial distance from a bearing surface on the front edge of the shank 17. Consequently, the upper end of the shank is free to swing about pin 31, toward or away from the plate 40, during normal operation of the apparatus, whether due to movement of the tractor over an irregularity in the ground level or upon extension or retraction of the rear link 19 to adjust the elevation of the plow. On the other hand, when the actuator is extended, bearing surface 40A on the rear edge thereof is forced against the bearing surface on the front edge of shank 17 to push the upper end of the shank rearwardly, and thereby cause it to rotate in a rearward or clockwise direction about pin 31. As will be seen from a comparison of FIGS. 1 and 3, this movement of the shank will force the rear end of the frame to swing upwardly, and thus raise the plow 33 so that it is free to move over a levee L (FIG. 3) or other irregularity in the surface of ground G.

The plow will be maintained in this raised position as long as pressure is held on the front side of the piston of actuator 41. Then, when the levee has been passed by the plow, it may be automatically returned to its original position for forming a ditch D of the depth indicated in FIG. 1 merely by manipulation of the hydraulic controls for the actuator 41 (which may be on the tractor) to relieve pressure on the front side of the piston and apply it to the rear side thereof, thereby causing retraction of the actuator in order to return the plate 40 to the position of FIG. 4. As can be seen from the drawings, this has been accomplished without any adjustment of the setting of the three point hitch, or the setting in the actuator portion of rear link 19. Although swinging of the frame from the position of FIG. 1 and to the position of FIG. 3 may change somewhat the position of the axis of pin 22 on the rear end of upper hitch arm 12, such movement is possible since the lift arm is pivoted at both ends, at the front end of the lifting mechanism of the three point hitch and at its rear end to the front post 15 of the frame.

As previously described, the bearing surfaces on the rear edge of the plate 40 and front edge of shank 17 diverge downwardly relatively to one another, when actuator 41 is retracted to withdraw surface 40A from the shank. More particularly, the angle at which the bearing surfaces extend is such that when the actuator is extended to push plate 40 against the shank, and thereby swing the shank to the position of FIG. 3, the bearing surfaces on the blade and shank are parallel to one another. As illustrated, it will be understood that when the plate first engages the shank bearing surface 40A of the plate contacts the bearing surface on the shank only along the upper edge of the plate. Then, as the actuator is further extended so as to engage and then swing the shank to its FIG. 3 position, the bearing surface on the plate gradually moves into face to face engagement with that of the shank over a broad area, as defined by the area of bearing surface 40A. Consequently, the bearing surfaces are arranged to provide maximum mechanical advantage in moving the shank to the position of FIG. 3 and then holding it in such position.

The previously described link used for maintaining the parts of the frame in fixed angular positions for transport purposes is indicated at 48 in FIG. 1 to be pivotally connected to upright plate 44 for swinging into a position to align a hole in its front end with a hole 49 in front post 15. In this way, a pin may be extended through the aligned holes to thus rigidly connect the link to the post and beam in order to hold the parts of the frame for transport purposes.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In land forming and/or farming apparatus, which comprises a frame adapted to be towed behind a tractor having a three point hitch, said frame including a longitudinally extending beam having a front end pivotally attachable to the lower arms of the hitch, a front post having a lower end pivotally connected to the beam and an upper end pivotally attachable to the upper arms of the hitch, a rear post pivotally connected to the beam near its rear end, an intermediate post pivotally connected to the beam intermediate the front and rear posts, a front link extending between and pivotally connected to the front and intermediate posts, a rear link extending between and pivotally connected to the intermediate and rear posts, a wheel mounted on the rear post for rolling engagement with the ground behind the blade, and an element carried by the intermediate post for engaging the ground beneath the beam, said rear link being extendible and retractable to control the elevation of said cutting edge; the improvement comprising a part mounted on the frame for guided movement longitudinally of the beam, a fluid-operated, extendible and retractable actuator having one end pivotally connected to the beam and its other end pivotally connected to said part for moving said part between a first position in which a bearing surface thereon is spaced from an oppositely facing bearing surface on one of the posts, and a second position in which it is forced against said bearing surface on the post so as to cause the upper end of the post to swing rearwardly about its pivotal connection to the beam, and thereby lift the rear end of the frame about its attachment to the three point hitch.

2. The improvement of claim 1, wherein the bearing surface of the part faces rearwardly and is pushed against a forwardly facing bearing surface on the post, and the actuator is extended to lift the rear end of the frame.

3. The improvement of claim 1, wherein the beam has a longitudinal guideway, and the part is guidably slidable in the guideway.

4. The improvement of claim 3, wherein the guideway is a slot through which the post extends.

5. The improvement of claim 4, wherein arms extend longitudinally of the beam to closely receive the post, said arms being slidable over the top side of the beam.

6. The improvement of claim 1, wherein the bearing surfaces on the part and post are downwardly divergent when said part is in its first position, and essentially parallel to one another when said part is in its second position.

* * * * *